(12) United States Patent
Bojanowski et al.

(10) Patent No.: US 11,667,178 B2
(45) Date of Patent: Jun. 6, 2023

(54) BOTTOM LOAD REMOVABLE ROOF PANEL SYSTEM

(71) Applicant: GM GLOBAL TECHNOLOGY OPERATIONS LLC, Detroit, MI (US)

(72) Inventors: Gerald M. Bojanowski, Washington Township, MI (US); William G. Farrand, II, Northville, MI (US); Besy James Philip, Rochester Hills, MI (US); Keith R. Grauherr, Twining, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/507,501

(22) Filed: Oct. 21, 2021

(65) Prior Publication Data

US 2023/0131621 A1    Apr. 27, 2023

(51) Int. Cl.
*B60J 7/043* (2006.01)
*B60J 7/16* (2006.01)
*B60J 10/70* (2016.01)

(52) U.S. Cl.
CPC ............. *B60J 7/1635* (2013.01); *B60J 10/70* (2016.02)

(58) Field of Classification Search
CPC ................................ B60J 7/1635; B60J 10/70
USPC .......... 296/216.01, 218, 216.02, 224, 216.06
See application file for complete search history.

(56) References Cited

U.S. PATENT DOCUMENTS

| | | | | |
|---|---|---|---|---|
| 2,190,462 A | * | 2/1940 | Votypka | B60J 7/043 296/213 |
| 4,138,155 A | * | 2/1979 | Chrysler | B60J 7/106 296/218 |
| 4,330,150 A | * | 5/1982 | Dunchock | B60J 7/11 296/218 |
| RE32,496 E | * | 9/1987 | Chrysler | B60J 7/106 296/218 |
| 4,729,596 A | * | 3/1988 | Fujihara | B60J 7/106 296/213 |
| 4,729,597 A | * | 3/1988 | Fujihara | B60J 7/106 16/272 |
| 4,786,102 A | * | 11/1988 | Sakamoto | B60J 7/047 296/218 |
| 4,799,726 A | * | 1/1989 | Scott | B60J 7/106 296/100.09 |
| 4,821,394 A | * | 4/1989 | Martinez-Vera | B60J 7/106 296/218 |

(Continued)

FOREIGN PATENT DOCUMENTS

DE    102021209267 A1 *   5/2022   ............... B60J 7/11

*Primary Examiner* — Jerry E Redman

(57) ABSTRACT

A removable roof panel system for a vehicle, includes a frame structure configured to be mounted to a roof of the vehicle. A front panel is removably mounted to the frame structure and including a front glass panel and a front panel frame. A rear panel is removably mounted to the frame structure and includes a rear glass panel and a rear panel frame. The frame structure includes a trough portion and supports a first seal configured to be disposed between the roof of the vehicle and the front and rear glass panels and a second seal disposed between the front and rear panel frames and the frame structure. A front latch system releasably secures the front panel to the frame structure and a rear latch system releasably secures the rear panel to the frame structure.

11 Claims, 2 Drawing Sheets

(56) References Cited

U.S. PATENT DOCUMENTS

| | | | | |
|---|---|---|---|---|
| 5,080,428 | A * | 1/1992 | Rouland | B60J 7/145 16/382 |
| 5,725,273 | A * | 3/1998 | Vernon | B60J 7/201 224/326 |
| 6,039,391 | A * | 3/2000 | Takahashi | B60J 7/11 296/218 |
| 8,991,896 | B1 * | 3/2015 | Whitehead | B60J 7/196 296/121 |
| 9,884,654 | B1 * | 2/2018 | Stojkovic | B62D 25/06 |
| 10,611,217 | B2 * | 4/2020 | Willard | B60J 7/194 |
| 11,465,479 | B2 * | 10/2022 | Krapfl | B60J 7/11 |
| 2015/0224860 | A1 * | 8/2015 | Bowles | B60J 7/20 296/210 |
| 2018/0222299 | A1 * | 8/2018 | Volpicelli | B60J 7/11 |
| 2019/0329638 | A1 * | 10/2019 | Willard | B60J 7/192 |
| 2021/0245590 | A1 * | 8/2021 | Brown | B60J 7/1635 |

* cited by examiner

BOTTOM LOAD REMOVABLE ROOF PANEL SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to removable roof panel system for a vehicle.

SUMMARY

A removable roof panel system for a vehicle, includes a frame structure configured to be mounted to a roof of the vehicle. A front panel is removably mounted to the frame structure and including a front glass panel and a front panel frame. A rear panel is removably mounted to the frame structure and includes a rear glass panel and a rear panel frame. The frame structure includes a trough portion and supports a first seal configured to be disposed between the roof of the vehicle and the front and rear glass panels and a second seal is disposed between the front and rear panel frames and the frame structure. A front latch system releasably secures the front panel to the frame structure and a rear latch system releasably secures the rear panel to the frame structure.

According to a further aspect, the frame structure can define a trough portion.

According to yet another aspect, the frame structure supports a first seal configured to be disposed between the roof of the vehicle and the front and rear glass panels and the frame structure supports a second seal disposed between the front and rear panel frames and the frame structure.

According to a still further aspect, the removable roof panel system includes a front latch system for securing the front panel to the frame structure and a rear latch system for securing the rear panel to the frame structure.

According to a still further aspect, the removable roof panel system includes a seal member disposed between the front glass panel and the rear glass panel and the seal member is supported by the rear panel frame.

According to a still further aspect, the removable roof panel system includes a trough structure disposed between the front panel frame and the rear panel frame and the trough structure is supported by the rear panel frame.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
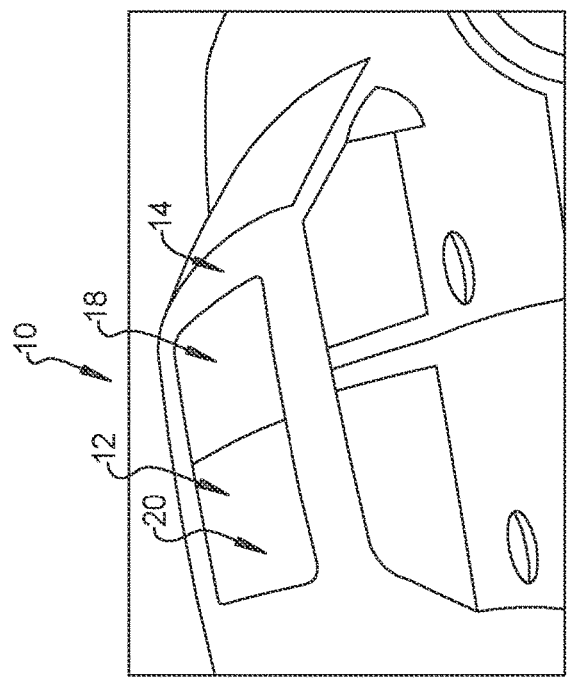
FIG. 1 is a perspective view of a vehicle having removable roof panel system.

With reference to FIG. 1, a vehicle 10 is shown including a removable roof panel system 12 installed in a roof 14 of the vehicle 10 according to the principles of the present disclosure. The removable roof panel system 12 is designed to be installed into a vehicle that already has a sunroof option, allowing a customer to select an option to be able to remove the roof panels creating a full open air environment instead of a sunroof partial glass open air environment.

Figure 2:
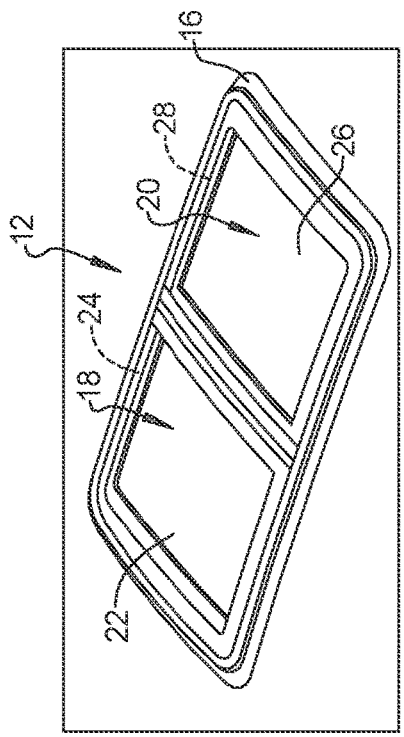
FIG. 2 is a top perspective view of the removable roof panel system.

With reference to FIG. 2, a top perspective view of the removable roof panel system 12 is shown including a frame structure 16, a front panel 18 and a rear panel 20. The front panel 18 includes a glass panel 22 and a panel frame 24 and the rear panel 20 includes a glass panel 26 and a panel frame 28.

Figure 3:
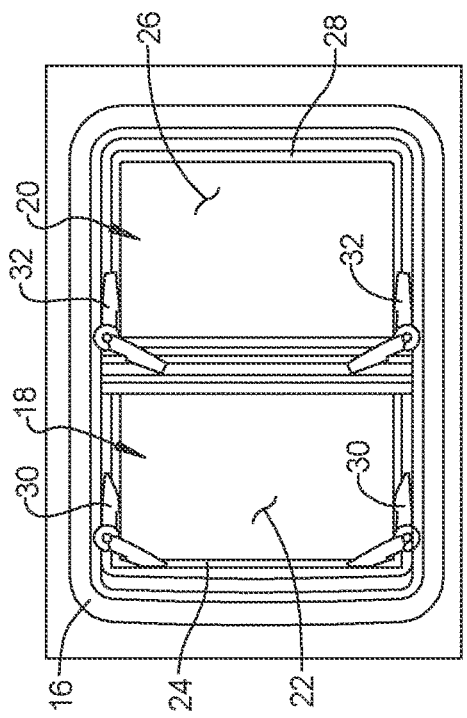
FIG. 3 is a bottom plan view of the removable roof panel system.

With reference to FIG. 3, a bottom plan view of the removable roof panel system 12 shows the front panel 18 including a pair of latches 30 for securing the front panel 18 to the frame structure 16 and a pair of latches 32 for securing the rear panel 20 to the frame structure 16.

Figure 4:
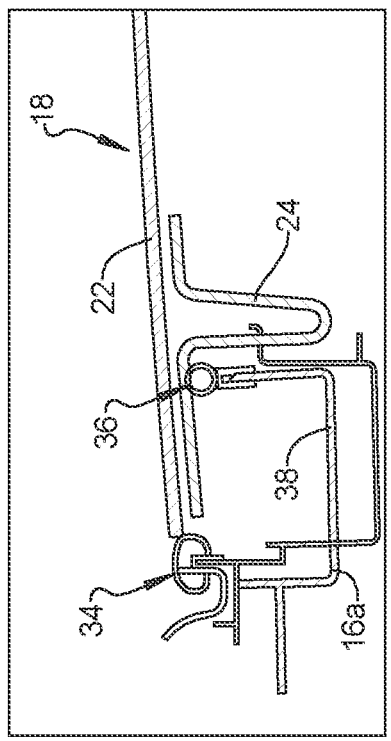
FIG. 4 is a cross sectional view of the front of the roof panel system and roof structure according to the principles of the present disclosure.

With reference to FIG. 4, a cross sectional view of the front of the roof panel system 12 and roof structure 14 is shown. The front panel 18 is shown including the glass panel 22 adhered to the panel frame 24. The frame structure 16 of the removable roof panel system 12 is supported by the roof 14. The frame structure 16 includes a front frame portion 16a that supports a first seal 34 that engages an edge of the glass panel 22 of the front panel 18 to inhibit water from passing between the first seal 34 and the glass panel 22. The first seal 34 further engages the roof structure 14 to prevent water from passing between the first seal 34 and the roof structure 14. The frame structure 16 further supports a second seal 36 that engages the panel frame 24 of the front panel 18. The front frame portion 16a defines a trough portion 38 that can catch any liquids that pass by the first seal 34 and direct them to a drain or desired leak path. The frame 16 can be secured to the roof structure 14 in a manner similar to existing sun roof frame structures.

Figure 5:
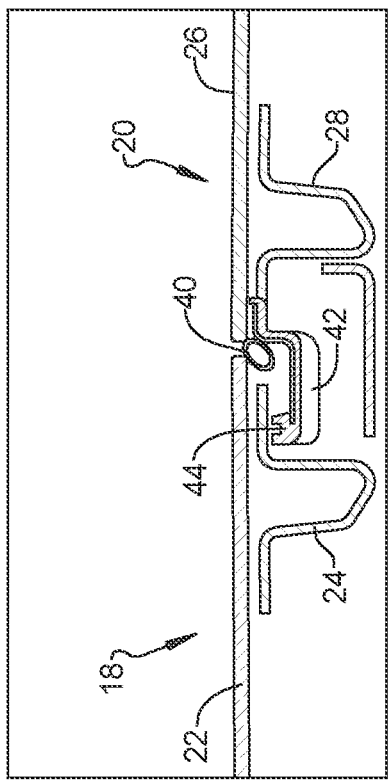
FIG. 5 is a cross sectional view of a center frame structure of the roof panel system according to the principles of the present disclosure.

With reference to FIG. 5, a cross-sectional view of an interface between a rear of the front panel 18 and a front portion of the rear panel 20 is shown. The panel frame 28 of the rear panel 20 supports a seal 40 that engages the edges of the front glass panel 22 and the rear glass panel 26. The panel frame 28 further includes a trough structure 42 that catches any fluid leaking past the seal 40 and directs the fluids laterally to the trough portion 38 of the frame structure 16. An elongated pad 44 is supported along a forward edge of the trough structure 42 and opposing the panel frame 24 of the front panel 18.

Figure 6:
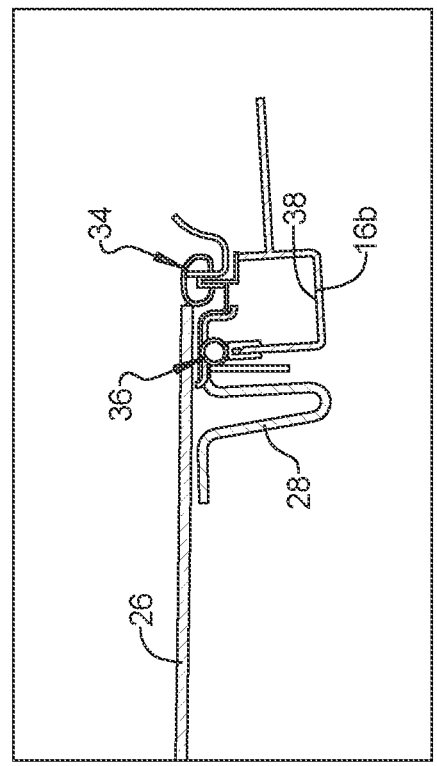
FIG. 6 is a cross sectional view of the rear of the roof panel system and roof structure according to the principles of the present disclosure.

With reference to FIG. 6, a cross-sectional view of the rear of the roof panel system 12 and roof structure 14 is shown.

The rear panel 20 is shown including the glass panel 26 adhered to the panel frame 28. The frame structure 16 of the removable roof panel system 12 is supported by the roof 14. The frame structure 16 includes a rear frame portion 16b that supports the first seal 34 that engages an edge of the glass panel 26 of the rear panel 20 to inhibit water from passing between the first seal 34 and the glass panel 26. The first seal 34 further engages the roof structure 14 to prevent water from passing between the first seal 34 and the roof structure 14. The rear frame portion 16b further supports the second seal 36 that engages the panel frame 28 of the rear panel 20. The rear frame portion 16b defines the trough portion 38 that can catch any liquids that pass by the first seal 34 and direct them to a drain or desired leak path.

Figure 7:
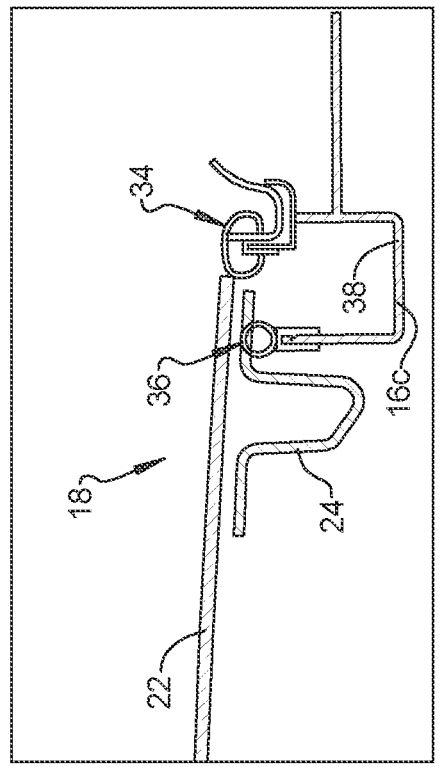
FIG. 7 is a cross sectional view of the side of the roof panel system and roof structure according to the principles of the present disclosure.

With reference to FIG. 7, a cross-sectional view of an interface between a side of the roof panel system 12 and roof structure 14 is shown. The front panel 18 is shown including the glass panel 22 adhered to the panel frame 24. In the cross-section shown, the frame structure 16 of the removable roof panel system 12 is supported by the roof 14. The frame structure 16 includes a side frame portion 16c that supports the first seal 34 that engages an edge of the glass panel 22 of the front panel 18 to inhibit water from passing between the first seal 34 and the glass panel 22. The first seal 34 further engages the roof structure 14 to prevent water from passing between the first seal 34 and the roof structure 14. The side frame portion 16c further supports the second seal 36 that engages the panel frame 24 of the front panel 18. The front frame portion 16c defines a trough portion 38 that can catch any liquids that pass by the first seal 34 and direct them to a drain or desired leak path.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A removable roof panel system for a vehicle, comprising:
    a frame structure configured to be mounted to a perimeter of an opening in a roof of the vehicle, the frame structure including a trough portion that extends around the perimeter of the opening;
    a first seal extends around an outer perimeter of the trough portion;
    a second seal extends around an inner perimeter of the trough portion;
    a front panel removably mounted to the frame structure and including a front glass panel and a front panel frame the front glass panel directly engaging the first seal and the front panel frame engaging the second seal; and
    a rear panel removably mounted to the frame structure and including a rear glass panel and a rear panel frame, the rear glass panel directly engaging the first seal and the rear panel frame engaging the second seal.

2. The removable roof panel system according to claim 1, further comprising a front latch system for securing the front panel to the frame structure.

3. The removable roof panel system according to claim 2, further comprising a rear latch system for securing the rear panel to the frame structure.

4. The removable roof panel system according to claim 1, further comprising a seal member disposed between the front glass panel and the rear glass panel.

5. The removable roof panel system according to claim 4, wherein the seal member is supported by the rear panel frame.

6. The removable roof panel system according to claim 5, further comprising a trough structure disposed between the front panel frame and the rear panel frame.

7. The removable roof panel system according to claim 6, wherein the trough structure is supported by the rear panel frame.

8. A removable roof panel system for a vehicle, comprising:
    a frame structure configured to be mounted to a perimeter of an opening in a roof of the vehicle and defining a trough portion that extends around the perimeter of the opening;
    a first seal extends around an outer perimeter of the trough portion;
    a second seal extends around an inner perimeter of the trough portion;
    a front panel removably mounted to the frame structure and including a front glass panel and a front panel frame, the front glass panel directly engaging the first seal and the front panel frame engaging the second seal;
    a rear panel removably mounted to the frame structure and including a rear glass panel and a rear panel frame the rear glass panel directly engaging the first seal and the rear panel frame engaging the second seal, the rear panel frame supporting a third seal that directly engages the front glass panel and the rear glass panel.

9. The removable roof panel system according to claim 8, further comprising a front latch system for securing the front panel to the frame structure and a rear latch system for securing the rear panel to the frame structure.

10. The removable roof panel system according to claim 8, further comprising a trough structure disposed between the front panel frame and the rear panel frame.

11. The removable roof panel system according to claim 10, wherein the trough structure is supported by the rear panel frame.

* * * * *